United States Patent [19]

Milom

[11] 4,038,617

[45] July 26, 1977

[54] APPARATUS FOR INDICATING THE OUTPUT OF A MACHINE

[76] Inventor: Joseph Milom, 8 Anson Road, Victoria Park, Manchester 14, England

[21] Appl. No.: 577,232

[22] Filed: May 14, 1975

[30] Foreign Application Priority Data

Sept. 27, 1974 United Kingdom ............... 42178/74

[51] Int. Cl.$^2$ .................................................. G01P 3/66

[52] U.S. Cl. ................................ 324/179; 235/92 PD; 235/92 A

[58] Field of Search ........... 324/179; 235/92 A, 92 Y, 235/92 PD, 92 MP, 92 MT, 92 T, 92 QC

[56] References Cited

U.S. PATENT DOCUMENTS

| | | | |
|---|---|---|---|
| 3,467,821 | 9/1969 | Arp | 235/92 |
| 3,548,165 | 12/1970 | Linnenkamp | 235/92 |
| 3,729,620 | 4/1973 | Jones | 235/92 PD |
| 3,750,603 | 8/1973 | Martin | 112/252 |
| 3,793,509 | 2/1974 | Isnard | 235/92 EL |

FOREIGN PATENT DOCUMENTS

| | | | |
|---|---|---|---|
| 2,260,549 | 12/1972 | Germany | 324/179 |

*Primary Examiner*—Rudolph V. Rolinec
*Assistant Examiner*—Vincent J. Sunderdick
*Attorney, Agent, or Firm*—Clarence A. O'Brien; Harvey B. Jacobson

[57] ABSTRACT

A sewing machine incorporates a ferrous member connected to a rotating part of the machine and a magnetic perception head disposed such that during operation of the machine the member moves towards and away from the head. Pulses produced by the head are fed to a counter which gives the total number of pulses and thus an indication of the total operating time of the machine and of the number of stitches made.

8 Claims, 7 Drawing Figures

APPARATUS FOR INDICATING THE OUTPUT OF A MACHINE

Figure 1:
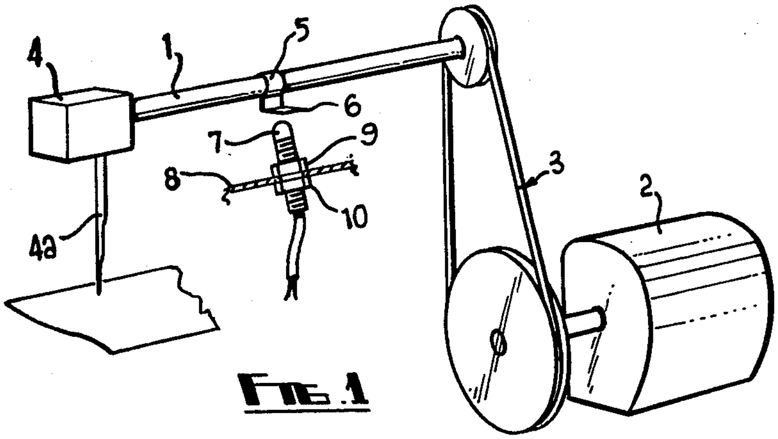

The present invention relates to apparatus for indicating the output of a machine and particularly, but not exclusively, for indicating the output of a sewing machine.

In the mass production of garments, the making up of the material after cutting comprises a number of quite distinct operations which are usually performed sequentially on a number of different machines. The relative positions and/or number of the machines must, for greatest efficiency, be arranged so that the flow of work from one machine to another is as smooth as possible and so that unnecessary accumulations of work are avoided. Furthermore, each individual machine should be operated for as long a time as possible in order to maximize the return on the capital investment in the machine. The provision of apparatus enabling the employer, and directly or indirectly the machine operator to determine output, provides an incentive facilitating the achievement of these objectives.

According to one aspect of the present invention, there is provided apparatus for indicating the output of a machine comprising a detector for detecting the cyclic movement of a part of the machine and operative to produce a signal during the periods of operation and a counter operative to receive the signal from the detector and to produce an indication of the total operating time of the machine.

In a preferred form of the invention the following features may be incorporated:

a. The detector is a magnetic perception head comprising a magnetic pole piece and an associated coil which is connected to the counter.

b. The detector and counter are connected by an electrical lead and plug and socket means are diposed in the lead.

c. The counter comprises a Schmitt Trigger pulse circuit.

d. The pulse circuit referred to in (c) has a hysteresis of 0.5 volt so that a count does not occur until the peak to peak amplitude of the input signal exceeds 1 volt.

e. The output of the Schmitt Trigger pulse circuit of (c) is connected to the first of two series connected decade counters the second of which is connected to a driver transistor.

f. The driver transistor of (e) is connected to the second decade through a capacitor.

g. The driver transistor of (e) is connected on its output side to a further driver transistor which in turn is connected to a mechanical counter which gives a visual representation of the pulses counted.

According to another aspect of the present invention there is provided a machine comprising a rotatable member, a device forming part of, or fixed to rotate with, the member, a detector disposed such that during operation of the machine the device cyclicly approaches and moves away from the detector and a counter operative to receive the signal from the detector and to produce an indication of the total operating time of the machine.

In addition, the following features may be incorporated into the machine.

a. The detector is a magnetic perception head, sensing movement of a device made of a ferrous material.

b. The ferrous device of (a) may be a plate fixed to a bracket which is in turn fixed round the member, or it may be eccentrically fixed in the end of the member.

c. The member may be a shaft in the machine forming part of the transmission from driving means to the machining part of the machine.

d. In the case of a sewing machine, the shaft of (c) will be the shaft from which the sewing needle or needles is/are driven and the counter will give an indication of the number of stitches made.

Figure 2:
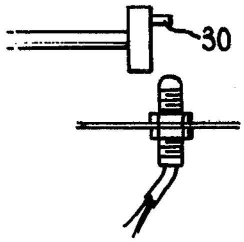
Figure 3:
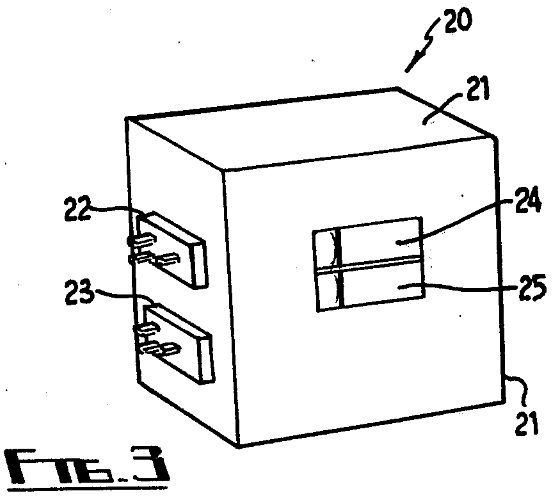
Figure 4:
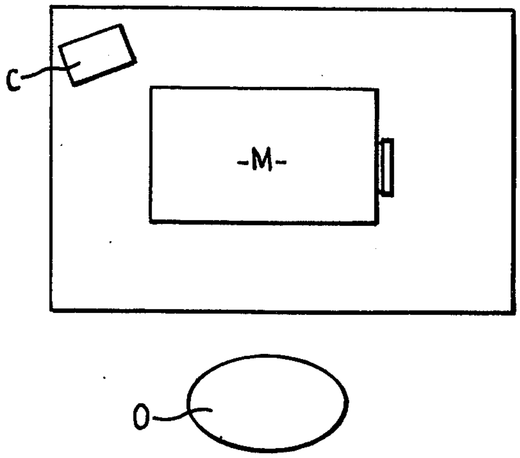
Figure 5:
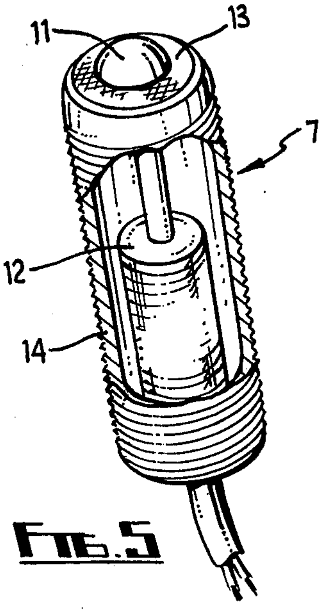
Figure 6:
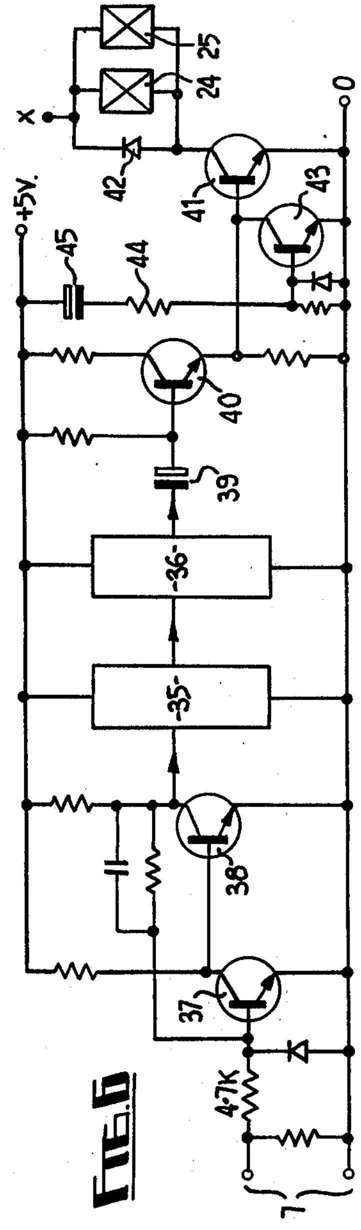
Figure 7:
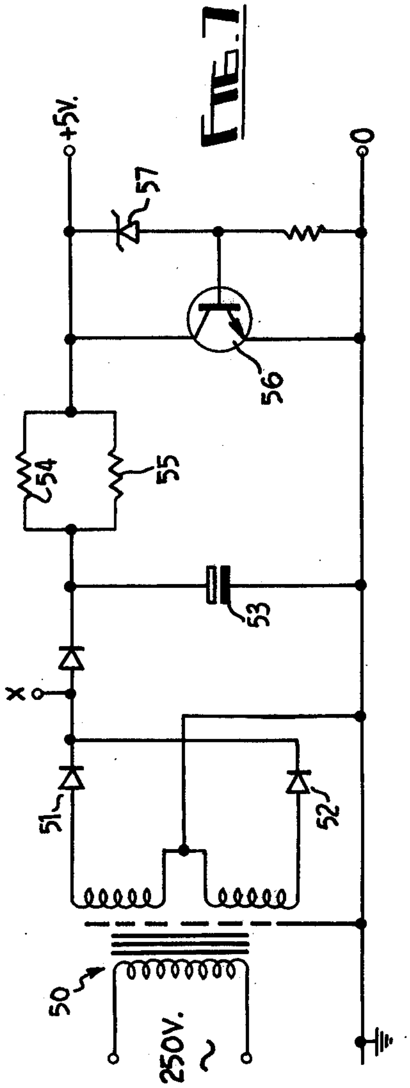

In order that the invention will be more fully understood, one embodiment of the invention will now be described, by way of example, with reference to the accompanying drawings in which:

FIG. 1 shows diagrammatically the connection of a detector to a sewing machine, FIG. 2 shows a modification of the arrangement of FIG. 1, FIG. 3 shows an external perspective view of the counter to be connected to the detector of FIG. 1 or FIG. 2, FIG. 4 shows a diagrammatic plan view of a sewing machine equipment with a counter as shown in FIG. 3., FIG. 5 shows a view partly broken away of a detector head, FIG. 6 shows a circuit diagram of the counter of FIG. 3 and, FIG. 7 shows a circuit diagram of the power supply for the counter.

Referring to FIG. 1, a shaft 1 of a sewing machine is driven by an electric motor 2 through a belt and pulley drive 3. The rotary motion of the shaft 1 is translated into a reciprocating motion via a transmission mechanism 4 to reciprocate a needle **4*a***. These and other parts of the sewing machine, such as a drive for feeding material into the needle, are well known.

A bracket 5 is fixed to the shaft 1 to rotate with it and a ferrous plate 6 is fixed to the bracket. A magnetic perception head 7 of cylindrical shape and externally threaded is fixed to the body 8 of the machine by means of two lock nuts 9 and 10 screwed onto the head on opposite sides respectively of the machine body. The position of the head 7 is such that only a very small air gap exists between it and the plate 6 of their closest relative position to provide a contactless cyclic motion sensor. The head 7 comprises a magnetic pole piece 11 at its end closest to the plate 6 and an associated coil 12 (see FIG. 5). Insulation 13 is disposed between the pole piece 11 and the threaded casing 14 of the head. A two core cable 15, which may if necessary be screened, or shielded leads from the head 7 to a counter 20 (FIG. 3). Screening or shielding may be necessary to avoid interference from other sounds around the machine.

This counter 20 comprises a moulded plastics housing 21 in which the counter circuitry is contained. Plugs 22 and 23 enable the counter to be plugged in the mains and to be connected to the detector 7. Count registering indicator mechanisms 24 and 25 slot into appropriately shaped recesses formed in the housing. In this example, one indicator counter serves to provide a daily count total and the other running total. If other totals were required, further counting mechanisms could be provided. Each counter is provided with a zeroing or reset device.

The position and arrangement of the detector head 7 will of course be chosen to suit the particular machine. FIG. 2 shows diagrammatically part of a machine in which the form of the driving shaft of the machine is such that a ferrous pin 30 may conveniently be eccentrically fitted to one of its axial ends and the form of the machine body such that the detector may conveniently be fitted directly beneath this axial end of the shaft. Where the detector is fitted to the driving shaft of the needles of the machine the pulses emanating from the detector will be a direct indication of the number of stitches made. Other shafts of the machine bearing a constant speed relationship to the "needle" shaft can of course be used to give an indication of the number of stiches providing note is taken of the speed relationship.

Referring to FIGS. 6 and 7, the counter circuit is built around two integrated circuit decade counters 35 and 36. A Schmitt Trigger circuit comprising two NPN transistors 37 and 38 is connected to the input of the first counter 35. The output from the head 7 is applied across the base emitter circuit of the transistor 37. A 4.7kΩ resistor is disposed in the lead to the base of transistor 37. The output of the decade counter 36 is connected through a capacitor 39 (8μF 6v D.C.) to the base of an NPN drive transistor 40. The emitter of transistor 40 is connected to the base of a further NPN driven transistor 41 and the collector of this transistor is connected to the two parallel connected counter mechanisms 24 and 25 aforementioned. A protective diode 42 is connected in parallel with the counter mechanisms. An additional NPN transistor 43 is connected across the base emitter junction of transistor 41. The base of this transistor 43 is connected through a 12kΩ resistor 44 and a capacitor 45 (8μF 6v. D.C.) to the positive 5v supply line. When the supply is switched on the capacitor 45 charges up and the resultant base current turns on transistor 43 which diverts current flowing in the base circuit of transistor 41 to ground. The time constant of the base circuit of transistor 43 is chosen to ensure that this diverting action takes place for a longer time than it takes to charge the capacitor 39. Without this additional transistor 43 it would be possible for the decade outputs to settle in a low state when a pulse is generated to drive the counter.

In this example, the Schmitt Trigger circuit has a hysterisis of ± 0.5 volt and provides immunity from noise at the input. Input signals must exceed 1 volt peak to peak before the circuit is triggered and a count occurs. The trigger circuit also ensures that pulses fed to the decade counters 35 and 36, which count down by 100, have the necessary rapid rise and fall times. Referring to FIG. 7, the power supply circuit comprises a transformer 50 having grounded centre tapped secondary, with diodes 51 and 52 connected in the arms. A storage capacitor 53 (400μF 40v D.C.) is connected between the centre tap and one of the arms. Two parallel connected resistors 54 and 55 are connected in the positive line and a PNP transistor 56 is connected between the positive line and the ground line. A zener diode 57 (4.2v) is connected between the base of transistor 56 and the positive line. The counting circuit is fed with 5v smoothed D.C. of the counters 24 and 25 themselves with unfiltered D.C. taken off at point X.

It should be noted that the second decade counter 36 could be directly coupled to the counter driven transistor 40. In that event, however, a larger counter current over dissipating the transformer 50 of the power supply circuit could result and an enormous storage capacitor would be needed to prevent the power supply voltage dropping. The capacitor coupling of transistor 40 results in a short current pulse being generated to drive the counter on the negative edge of the decade counter pulse. During this short pulse the capacitor 53 (400μF 40v. D.C.) is more than adequate to maintain the supply voltage.

FIG. 4 shows one advantageous example of a sewing machine M with a counter C positioned on the supporting work table T of the machine. The counter C is placed clearly in view of the operator 0 and gives a continuous clear indication of the number of stitches so far produced that day and also that week (if desired). There is thus an ever present incentive resulting in better rewards for the operator and more efficient use of the sewing machine resulting in increased production for the employer.

What is claimed is:

1. In combination with a machine having a part undergoing cyclic movement during operation, means for registering operation of the machine comprising a detector device having a magnetic coil and a pole piece spaced by an air gap from said part, means connected to the coil for establishing a magnetic field in said air gap periodically traversed by said part during said cyclic movement thereof, a counter device connected to the coil for receiving pulse signals generated in the coil by said part traversing the magnetic field, and indicator means connected to the counter device for visually registering the number of operational cycles of the machine, the counter device including a Schmitt Trigger pulse circuit and a pair of series connected decade counters, one of the counters being driven by the pulse circuit and the second of the counters being connected to a drive transistor, the drive transistor being connected to the second decade counter through a capacitor.

2. Apparatus as claimed in claim 1, wherein the indicator means includes a mechanical counter driven by the drive transistor to provide a visual representation of the pulses counted.

3. The combination of claim 1 wherein said part of the machine includes a rotatable member, and a device fixed to rotate with the member.

4. The combination of claim 3, wherein the device is made of a ferrous material.

5. The combination set forth in claim 4, wherein the ferrous device is a plate and a bracket fixed to the member on which the plate is carried.

6. The combination as claimed in claim 4, wherein the ferrous device is eccentrically fixed in the end of the member.

7. The combination as claimed in claim 3, wherein the member is a shaft forming part of a transmission.

8. The combination as claimed in claim 7, wherein said machine includes a sewing needle driven by the shaft, whereby the counter provides an indication of the number of stitches made.

* * * * *